US010091164B2

(12) United States Patent
Mullin

(10) Patent No.: US 10,091,164 B2
(45) Date of Patent: Oct. 2, 2018

(54) SYSTEM AND METHOD FOR MAPPING PHYSICAL LOCATIONS OF MOTORS IN A NETWORK

(71) Applicant: Regal Beloit America, Inc., Beloit, WI (US)

(72) Inventor: Paul Steven Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 309 days.

(21) Appl. No.: 14/792,023

(22) Filed: Jul. 6, 2015

(65) Prior Publication Data

US 2017/0012938 A1 Jan. 12, 2017

(51) Int. Cl.

| | |
|---|---|
| ***G06F 15/16*** | (2006.01) |
| ***H04L 29/12*** | (2006.01) |
| ***H04L 12/28*** | (2006.01) |
| ***H04L 12/701*** | (2013.01) |

(52) U.S. Cl.

CPC ........ *H04L 61/609* (2013.01); *H04L 12/2827* (2013.01); *H04L 45/00* (2013.01); *H04L 61/2038* (2013.01)

(58) Field of Classification Search

None

See application file for complete search history.

(56) References Cited

U.S. PATENT DOCUMENTS

| | | | | |
|---|---|---|---|---|
| 8,165,719 | B2 | 4/2012 | Kinney et al. | |
| 8,988,099 | B2 | 3/2015 | Hall et al. | |
| 2004/0184619 | A1 * | 9/2004 | Inagaki | H04R 5/04 381/77 |
| 2006/0071622 | A1 * | 4/2006 | Townsend | B25J 9/1612 318/400.31 |
| 2012/0015566 | A1 * | 1/2012 | Salmon | B63H 21/21 440/1 |
| 2013/0315286 | A1 * | 11/2013 | Shad | H04B 3/54 375/224 |

FOREIGN PATENT DOCUMENTS

| | | |
|---|---|---|
| CN | 203761417 U | 8/2014 |
| CN | 204008979 U | 12/2014 |
| FR | 2984517 A1 | 6/2013 |
| GB | 576600 | 2/1944 |
| GB | 752499 | 7/1956 |
| KR | 20140127260 | 11/2014 |

* cited by examiner

*Primary Examiner* — Mohamed Ibrahim

(74) *Attorney, Agent, or Firm* — Armstrong Teasdale LLP

(57) ABSTRACT

A motor network mapping device is provided. The motor network mapping device includes a processor coupled to a memory device. The motor network mapping device is configured to determine physical distances between a plurality of motors in a network using properties of electronic test signals transmitted through a power line coupled to the plurality of motors. The motor network mapping device is additionally configured to generate a map of physical locations of the motors using the determined physical distances between the plurality of motors and store the map in the memory device.

18 Claims, 6 Drawing Sheets

SYSTEM AND METHOD FOR MAPPING PHYSICAL LOCATIONS OF MOTORS IN A NETWORK

BACKGROUND

The field of the disclosure relates generally to transmitting data among motors in a network, and more specifically to generating a map of a physical layout of motors in a network based on properties of electronic signals transmitted from the motors.

In at least some environments, multiple motors operate in conjunction to perform a function. For example, in a grocery store, multiple motors operate within physical containers of refrigerated food items to circulate cold air through the physical containers. A single physical container may include multiple motors that are configured to operate in a complimentary manner, for example by dividing an overall target amount of air circulation among the motors. In at least some instances, when the motors are initially installed, a technician sets operating parameters of the motors such that the motors operate in a complimentary manner. However, over time, the performance and/or locations of the motors may change, causing the original operating parameters to no longer be suited for the new physical locations and/or performance of the motors. Reconfiguring the motors is expensive and labor intensive.

BRIEF DESCRIPTION

In one aspect, a motor network mapping device is provided. The motor network mapping device includes a processor coupled to a memory device. The motor network mapping device is configured to determine physical distances between a plurality of motors in a network using properties of electronic test signals transmitted through a power line coupled to the plurality of motors. The motor network mapping device is additionally configured to generate a map of physical locations of the motors using the determined physical distances between the plurality of motors and store the map in the memory device.

In another aspect, a method for mapping locations of motors in a network is provided. The method is implemented by a motor network mapping device that includes a processor coupled to a memory device. The method includes determining, by the motor network mapping device, physical distances between a plurality of motors in a network using properties of electronic test signals transmitted through a power line coupled to the plurality of motors. The method additionally includes generating, by the motor network mapping device, a map of physical locations of the motors using the determined physical distances between the plurality of motors. Additionally, the method includes storing, by the motor network mapping device, the map in the memory device.

In another aspect, a computer-readable storage device having computer-executable instructions stored thereon is provided. When executed by a motor network mapping device including a processor coupled to a memory device, the instructions cause the motor network mapping device to determine physical distances between a plurality of motors in a network using properties of electronic test signals transmitted through a power line coupled to the plurality of motors. The instructions additionally cause the motor network mapping device to generate a map of physical locations of the motors using the determined physical distances between the plurality of motors and store the map in the memory device.

DETAILED DESCRIPTION

A motor network mapping device is described herein. In some implementations, the motor network mapping device is included in a motor and, in other implementations, the motor network mapping device is a standalone device or is included in a networking component other than a motor, such as in a gateway between a network of motors and an external network (e.g., the Internet). The motor network mapping device analyzes properties of test electronic signals transmitted from each motor in a network and determines distances between the motors from the properties of the electronic test signals. Using the distance information, the motor network mapping device generates a map of a physical layout of the motors within an area, and transmits the map to the motors to enable the motors to coordinate their operations in view of their locations relative to each other.

In one implementation, a computer program is described, and the program is embodied on a computer-readable medium. In an example implementation, the computer program is executed on a standalone computing device. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
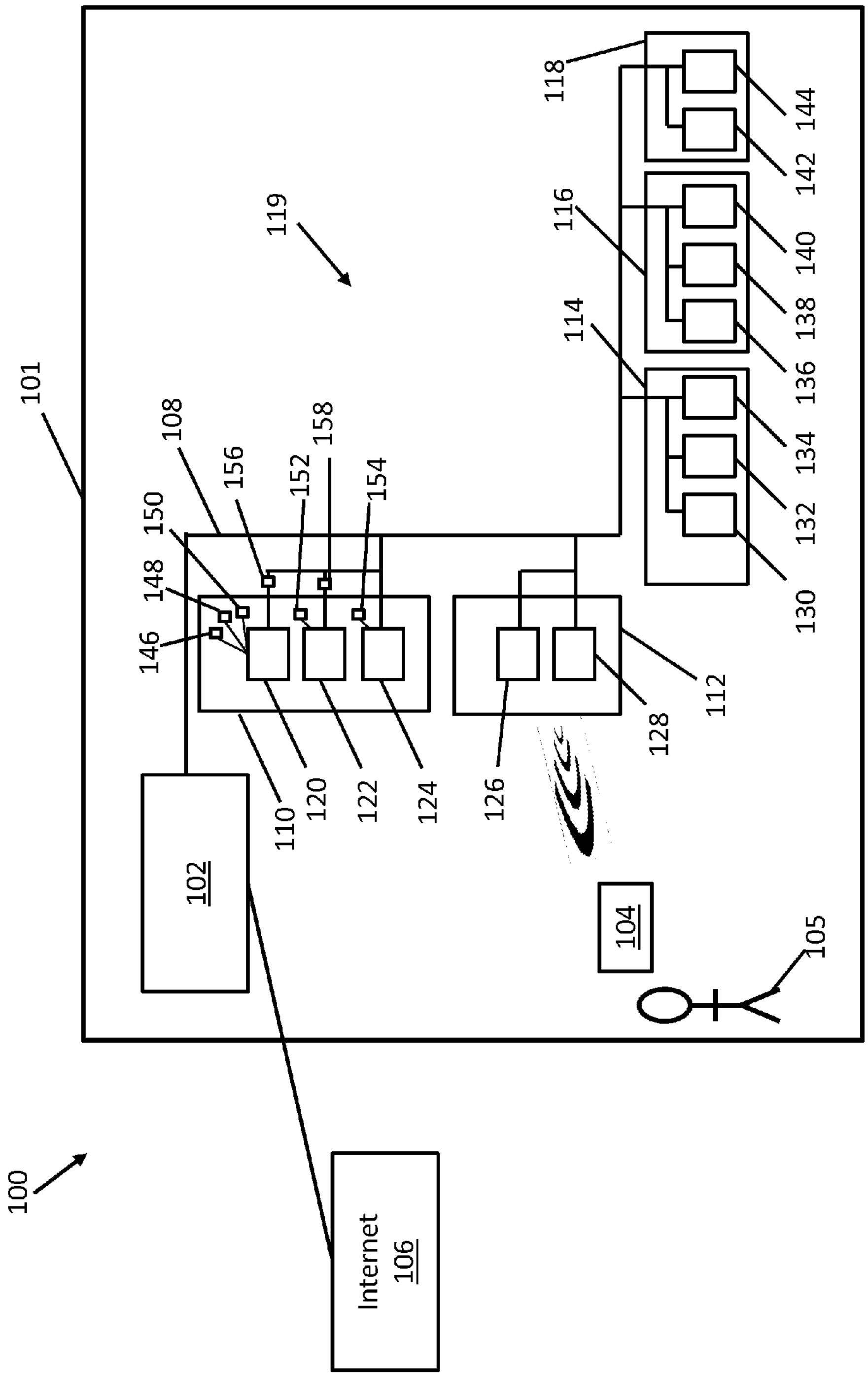
FIG. 1 is a diagram of an example environment in which a motor network mapping device operates.

FIG. 1 is a block diagram of an example environment 100 including a building 101 (e.g., a grocery store) in which a motor network mapping device 102 operates. Motor network mapping device 102 is coupled to a plurality of motors 119 through a power line 108. More specifically, motor network mapping device 102 transmits and receives data signals with the plurality of motors 119 through power line 108. Power line 108 also transmits electricity to each of the plurality of motors. Building 101 includes a first physical container 110, a second physical container 112, a third physical container 114, a fourth physical container 116, and a fifth physical container 118. First physical container 110 is a refrigeration unit and includes a first motor 120, a second motor 122, and a third motor 124. Second physical container 112 is a freezer unit and includes a fourth motor 126 and a fifth motor 128. Third physical container 114 is a refrigeration unit and includes a sixth motor 130, a seventh motor 132, and an eighth motor 134. Fourth physical container 116 is also a refrigeration unit and includes a ninth motor 136, a tenth motor 138, and an eleventh motor 140. Fifth physical container 118 is a freezer unit and includes a twelfth motor 142 and a thirteenth motor 144. Physical containers 110, 112, 114, 116, and 118 store refrigerated and/or frozen food and drink items for display to potential consumers in building 101. In other implementations, one or more of physical containers 110, 112, 114, 116, and 118 is any other type of housing in which one or more motors operates to regulate a temperature and/or a flow of air or other fluid. Further, in some implementations, the number of physical containers is different than five.

In some implementations, a technician 105 installs one or more of the plurality of motors 119 in building 101 and operates a commissioning device 104 that transmits configuration data, such as operational parameters and a device identifier to each motor 119. Additionally, in at least some implementations, technician 105 visits building 101 and operates commissioning device 104 to receive operating data from each of the motors 119, for example to detect faults in one or more of the motors and/or to replace, remove, or install motors. In some implementations, commissioning device 104 communicates with each motor 119 through near field communication (NFC). In other implementations, commissioning device 104 communicates with motors 119 using a different wired or wireless data communication protocol.

Motor network mapping device 102 generates a map of a physical layout of motors 119 and enables motors 119 to share information between them in a manner that takes into account their physical locations within building 101. In some implementations, each motor transmits a test signal 156 through power line 108. Motor network mapping device 102 receives test signal 156 and determines a location of each motor 119, from properties of each test signal 156, for example a frequency domain response, a time domain response, or an attenuation of the amplitude of test signal 156. For example, in some implementations, test signal 156 includes a device identifier corresponding to the motor transmitting test signal 156 and a message portion that includes an original value of the property that motor network mapping device 102 compares to a received value of the property (e.g., a time at which first motor 120 transmits test signal 156 compared to a time at which motor network mapping device 102 receives test signal 156, an initial set of frequency values of test signal 156 when first motor 120 transmits test signal compared to a second set of frequency values of test signal 156 when motor network mapping device receives test signal 156, and/or an original amplitude of test signal 156 when first motor 120 transmits test signal 156 compared to a received amplitude of test signal 156 when motor network mapping device 102 receives test signal 156). Motor network mapping device 102 performs the above process for each motor 119 sequentially.

The results of each test represents a corresponding length of power line 108 that test signal 156 traversed in order to reach motor network mapping device 102. Using the results, motor network mapping device 102 determines that motors 119 associated with test signals 156 having similar properties (e.g., within a predefined range of each other) are grouped together in physical containers (e.g., first physical container 110). Additionally, motor network mapping device 102 determines distances between groups of motors 119, based on, for example, an average difference in properties of test signal 156 transmitted from motors 119 in first physical container 110 compared to properties of test signal 156 transmitted from motors 119 in second physical container 112, third physical container 114, fourth physical container 116, and fifth physical container 118. Accordingly, and as described in more detail herein, motor network mapping device 102 determines that first physical container 110 and second physical container 112 are in a first neighborhood and that third physical container 114, fourth physical container 116, and fifth physical container 118 are in a second neighborhood. Additionally, in at least some implementations, motor network mapping device 102 determines that the first neighborhood and the second neighborhood at least partially overlap, as described in more detail herein.

In some implementations, motor network mapping device 102 additionally operates as a gateway to an external network, such as the Internet 106. In some implementations, motor network mapping device 102 is included in one of motors 119. In some implementations, motor network mapping device 102 transmits the generated map to motors 119. Each motor 119 then stores the received map in memory for use in communicating with other motors 119. First motor 120 is coupled to a door sensor 146, an occupancy sensor 148 (e.g., a motion detector), and a first lighting device 150. In some implementations, first motor 120 receives a signal from door sensor 146 indicating that a door of first physical container 110 has opened. Accordingly, first motor 120 transmits a lighting signal to lighting device 150 to illuminate (e.g., to direct light at products stored in first physical container 110). Additionally, first motor 120 temporarily stops circulating air in first physical container 110 to reduce the amount of cold air that escapes first physical container 110 when the door is open. Further, first motor 120 transmits a message signal 158 through power line 108 that includes the device identifier of first motor 120 and a message indicating that door sensor 146 has detected that the door has opened. Every motor in the plurality of motors 119 receives message signal 158. Using the map stored in memory, each motor 119 determines whether to take action based on the message and the device identifier.

Second motor 122 and third motor 124 determine that message signal 158 originated from first motor 120, which is in the same physical container (e.g., first physical container 110) as second motor 122 and third motor 124, and cause a second lighting device 152 coupled to second motor 122, and a third lighting device 154 coupled to third motor 124 to illuminate. Further, second motor 122 and third motor 124 temporarily stop circulating air to reduce the amount of cold air that escapes first physical container 110 while the door is opened. Other motors in the plurality of motors 119 receive message signal 158 as well, but determine that no action should be taken because the message does not pertain to second physical container 112, third physical container 114, fourth physical container 116, or fifth physical container 118. Similarly, in at least some implementations, occupancy sensor 148 detects the presence of a person near first physical container 110 and first motor 120 transmits message signal 158 indicating that occupancy sensor 148 detected the presence of a person. Accordingly, second motor 122 and third motor 124 cause lighting devices 152 and 154 to illuminate, while other motors in the plurality of motors 119 take no action in response to message signal 158.

Figure 2:
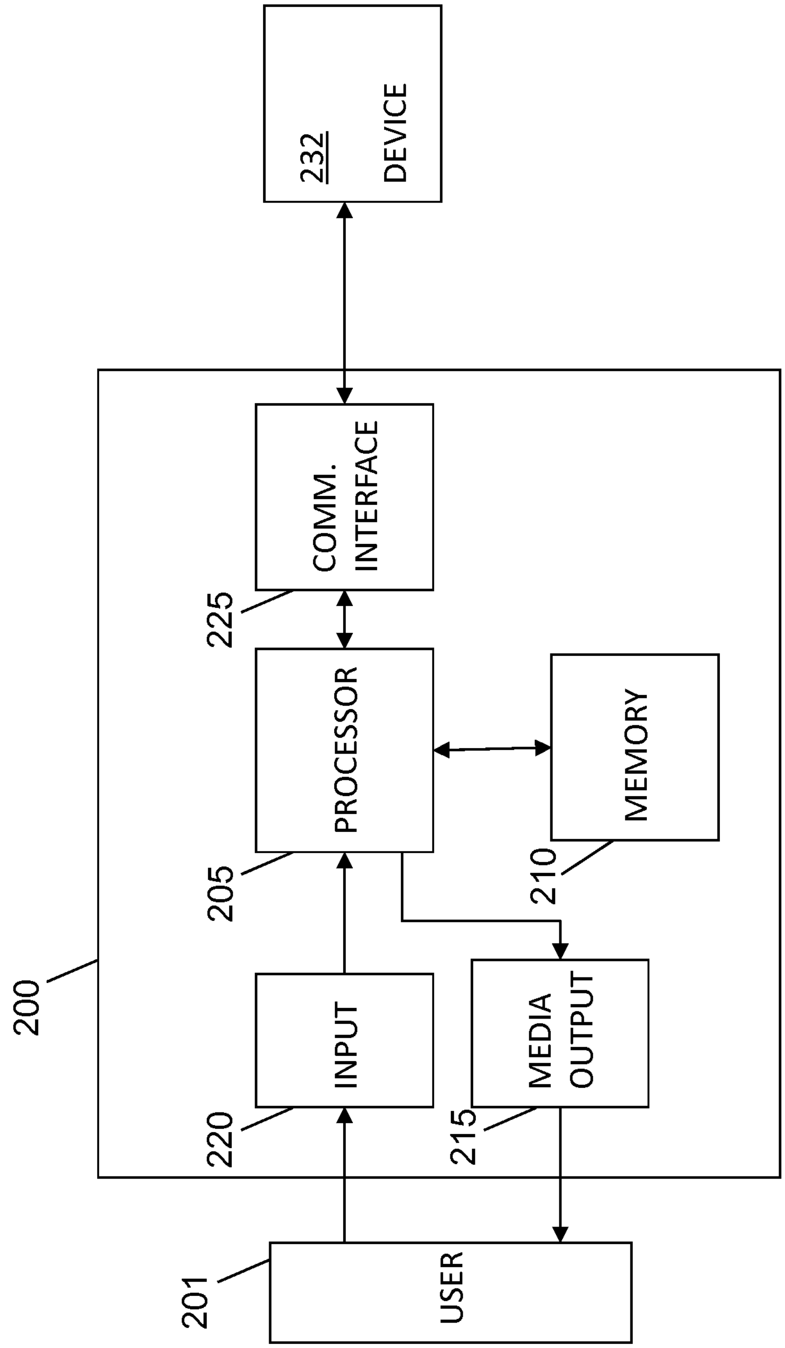
FIG. 2 is a block diagram of an example computing device included in the system of FIG. 1.

FIG. 2 is a block diagram of an example computing device 200. At least some components of computing device 200 are included in implementations of other devices describe herein, for example motor network mapping device 102, commissioning device 104, and each of motors 119. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220.

Computing device 200 may also include a communication interface 225, which is communicatively couplable to another device 232, for example motor network mapping device 102, commissioning device 104, and/or one or more of motors 119. In some implementations, communication interface 225 is configured to enable communication through a short range wireless communication protocol such as near field communication (NFC), Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals, such as power line 108).

Figure 3:
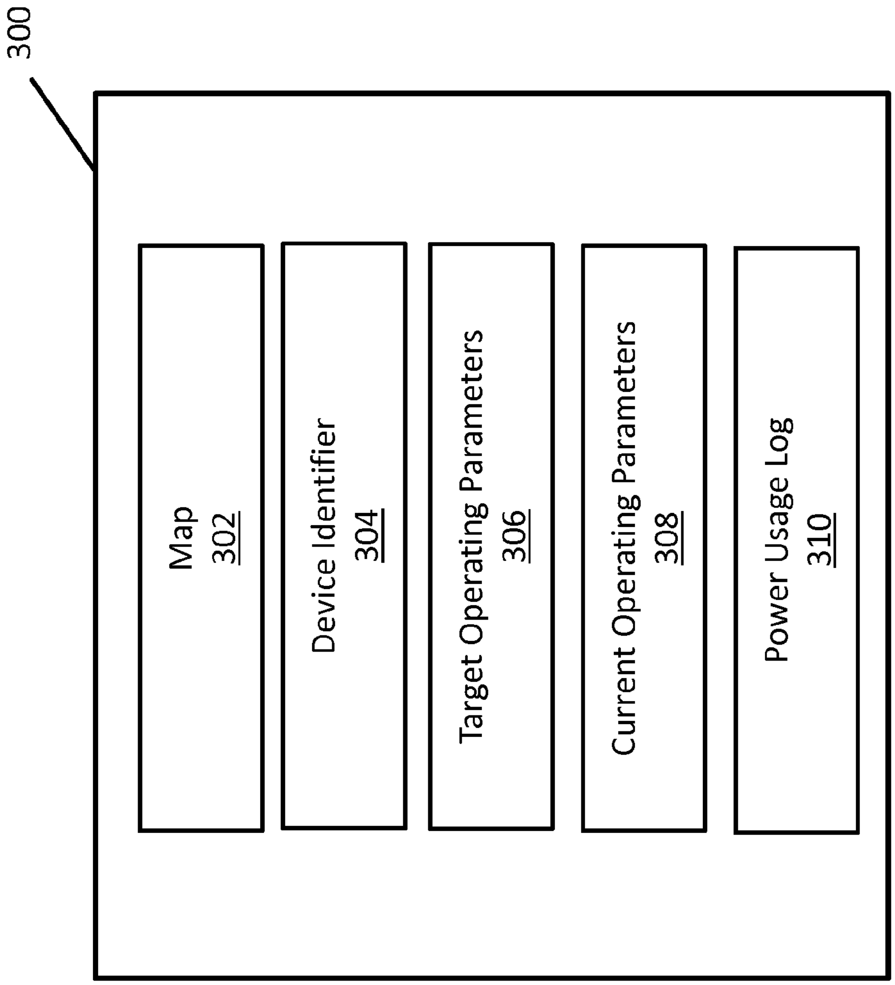
FIG. 3 is a diagram of example memory sections stored in a memory area of a computing device for use in the environment shown in FIG. 1.

FIG. 3 is a diagram of memory sections 300 stored in a memory area 210, for example in each motor 119. Memory sections 300 include a map 302 generated by motor network mapping device 102 and transmitted to motors 119, as described above. Additionally, memory sections 300 include a device identifier 304 that uniquely identifies each motor 119. In some implementations, each motor 119 receives and stores a respective device identifier 304 when each motor 119 is commissioned, as described above. In other implementations, a manufacturer of each motor 119 assigns and stores device identifier 304 in memory area 210. Additionally, memory sections 300 include target operating parameters 306 which define, for example, a torque, a speed, a power usage, and/or a fluid flow that the corresponding motor 119 is programmed to operate at. In some implementations, each motor 119 receives one or more target operating parameters 306 from commissioning device 104 when each motor 119 is installed. As described in more detail herein, in at least some implementations, motors 119 adjust target operating parameters 306 in response to changes in the number, layout, and/or operation of other motors 119 around a given motor 119. Further, memory sections 300 include current operating parameters 308 of the corresponding motor 119, including, for example, a current torque, a current speed, a current power usage, and/or a current fluid flow. Additionally, memory sections 300 include a power usage log 310 that includes an amount of power used by the respective motor 119 over a predefined time period (e.g., a month, a week, or a day).

Figure 4:
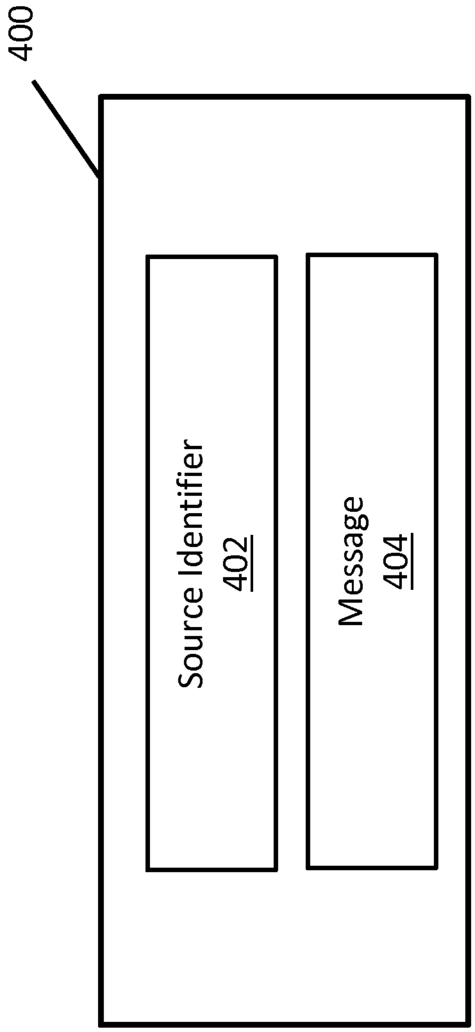
FIG. 4 is a diagram of a message signal transmitted from one device to one or more other devices in the environment shown in FIG. 1.

FIG. 4 is a diagram of a message signal 400 transmitted from a device (e.g., one of motors 119) to one or more other devices (e.g., one of motors 119) in environment 100 (e.g., FIG. 1). Message signal 400 includes a source identifier 402, for example device identifier 304 (FIG. 3), and a message 404. Message 404 includes, for example, data from a sensor such as door sensor 146 or occupancy sensor 148, a command, for example a command to illuminate first lighting device 150 or to set one or more target operating parameters 306 (FIG. 3), or a status of one of motors 119, such as one or more current operating parameters 308 (FIG. 3).

Figure 5:
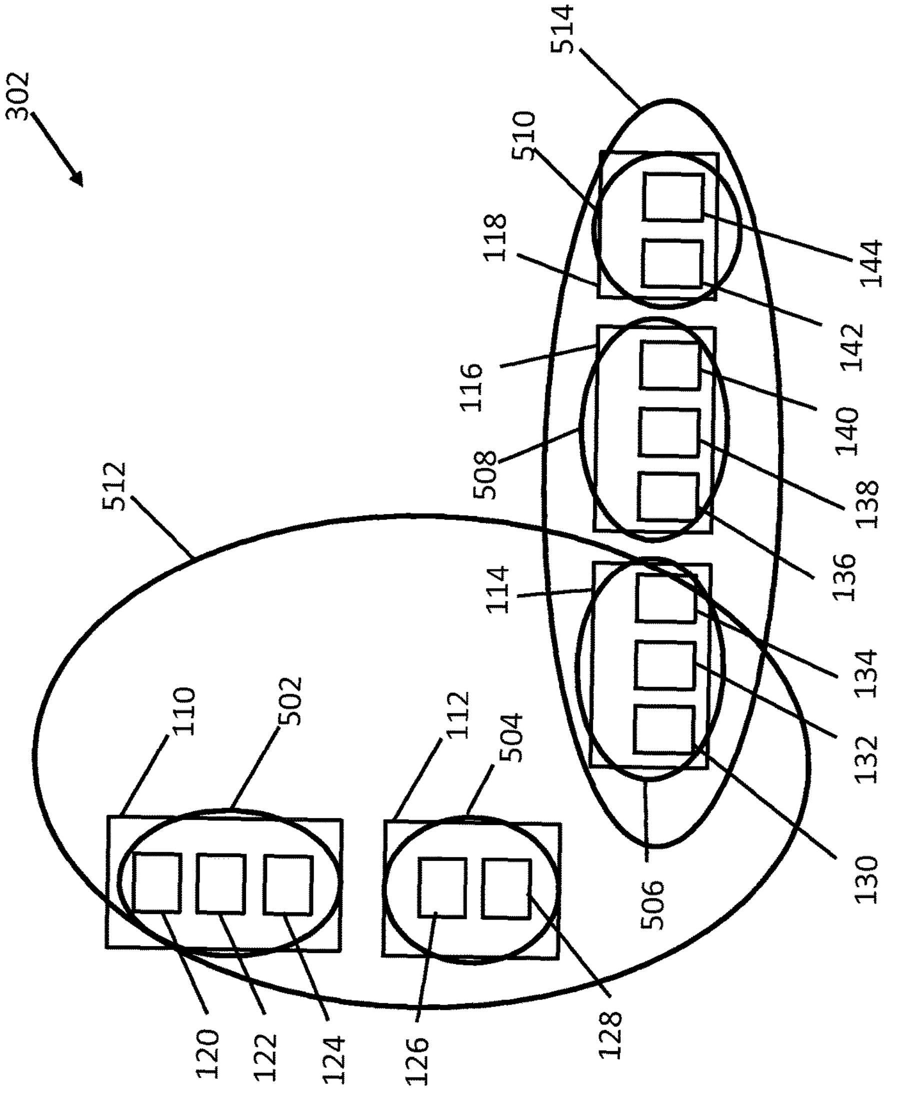
FIG. 5 is a diagram of a map generated by the motor network mapping device shown in FIG. 1.

FIG. 5 is a diagram of map 302 generated by motor network mapping device 102. As described above, in some implementations, motor network mapping device 102 transmits map 302 to each motor 119 in environment 100. Map 302 identifies first motor 120, second motor 122, and third motor 124 as being included within a first cohort set 502 (i.e., inside first physical container 110). Map 302 additionally identifies fourth motor 126 and fifth motor 128 as being included within a second cohort set 504 (i.e., inside second physical container 112). Further, map 302 identifies sixth motor 130, seventh motor 132, and eighth motor 134 as being included in a third cohort set 506. Additionally, map 302 identifies ninth motor 136, tenth motor 138, and eleventh motor 140 as being included in a fourth cohort set 508. Further, map 302 identifies twelfth motor 142 and thirteenth motor 144 as being included in a fifth cohort set 510. Map 302 additionally defines a first neighborhood 512 and a second neighborhood 514. First neighborhood 512 includes first cohort set 502, second cohort set 504, and third cohort set 506. Second neighborhood 514 includes third cohort set 506, fourth cohort set 508, and fifth cohort set 510. More specifically, first neighborhood 512 partially overlaps with second neighborhood 514, as third cohort set 506 is included in both first neighborhood 512 and second neighborhood 514.

When one of motors 119 (e.g., second motor 122) receives message signal 158 from another one of motors 119 (e.g., first motor 120), the receiving motor 119 (e.g., second motor 122) determines whether message 404 is pertinent to the receiving motor 119 (e.g., second motor 122) by (i) determining which motor 119 transmitted the message (e.g., first motor 120) from source identifier 402 and (ii) determining whether the transmitting motor 119 (e.g., first motor 120) is in the same cohort set (e.g., first cohort set 502) or same neighborhood (e.g., first neighborhood 512). For example, if second motor 122 receives message signal 158 indicating that current operating parameters 308 of first motor 120 are less than target operating parameters 306, then second motor 122, in at least some implementations, increases target operating parameters 306 of second motor 122 to compensate for the reduced performance of first motor 120 and to maintain a constant temperature in first physical container 110. As another example, if first motor 120 transmits message signal 158 indicating that occupancy sensor 148 has detected the presence of a person, all motors 119 in first neighborhood 512 cause lighting devices in first physical container 110 (e.g., first lighting device 150, second lighting device 152, and third lighting device 154), second physical container 112 (lighting devices not shown), and third physical container 114 (lighting devices not shown) to illuminate.

Figure 6:
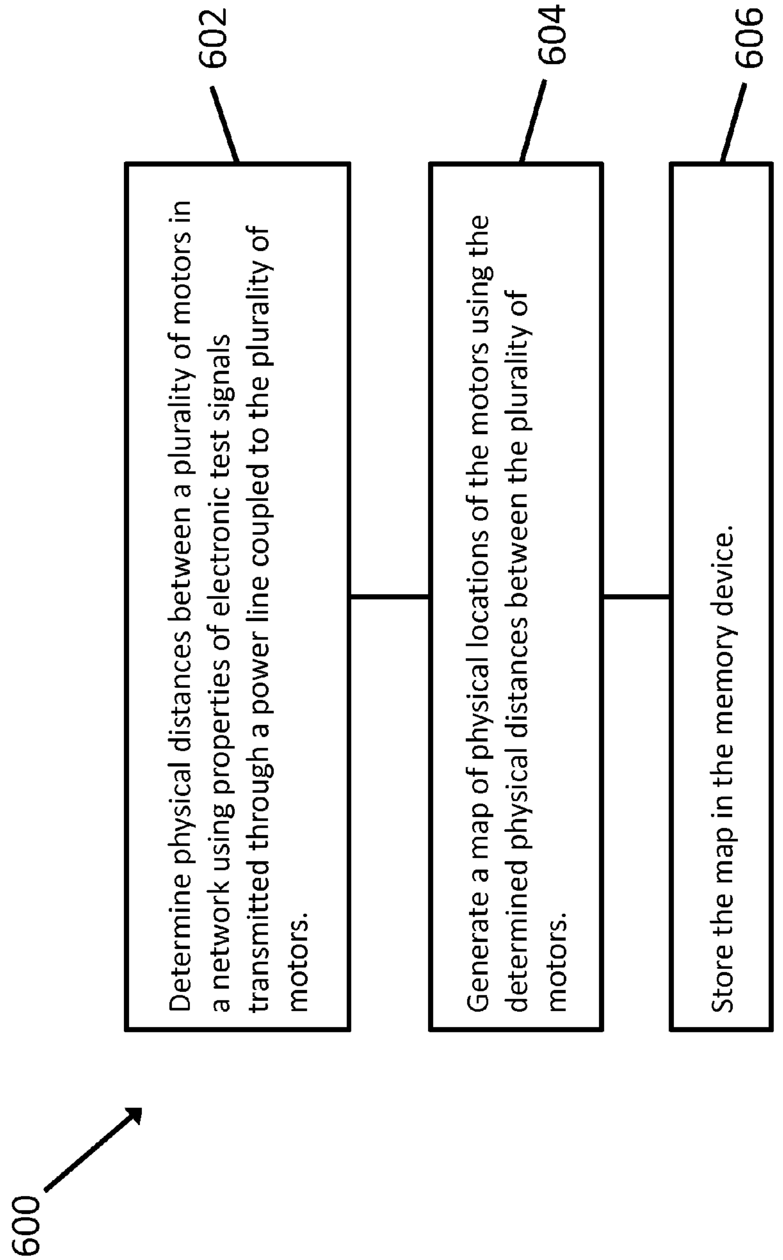
FIG. 6 a flowchart of a process performed by the motor network mapping device shown in FIG. 1.

FIG. 6 a flowchart of a process 600 performed by motor network mapping device 102. Initially, motor network mapping device 102 determines 602 physical distances between a plurality of motors (e.g., motors 119) in a network (e.g., environment 101) using properties of electronic test signals (e.g., test signal 156) transmitted through a power line (e.g., power line 108) coupled to the plurality of motors (e.g., motors 119). Additionally, motor network mapping device 102 generates 604 a map (e.g., map 302) of physical locations of the motors (e.g., motors 119) using the determined physical distances between the plurality of motors 119. Further, motor network mapping device 102 stores 606 the map (e.g., map 302) in a memory device (e.g., memory area 210). In at least some implementations, memory device (e.g., memory area 210) and processor 205 are included in a single physical device (e.g., motor network mapping device 102). Further, in at least some implementations, motor network mapping device 102 is included in a motor (e.g., first motor 120).

In some embodiments, motor network mapping device 102 additionally receives a message signal (e.g., message signal 158) from a source motor (e.g., first motor 120) included in the plurality of motors 119 in the network (e.g., environment 100), wherein the message (e.g., message signal 158) includes a source identifier (e.g., source identifier 402) and a message (e.g., message 404). Additionally, motor network mapping device 102 determines the physical location (e.g., first physical container 110, associated with first cohort set 502) that the message pertains to using the source identifier (e.g., source identifier 402) and the map (e.g., map 302).

Motor network mapping device 102, in some implementations, determines the physical distances between the plurality of motors 119 by determining at least one of time domain responses, frequency domain responses, and amounts of attenuation in the electronic test signals (e.g., test signal 156) transmitted through the network. Also, in some implementations, motor network mapping device 102 determines that a first subset (e.g., first cohort set 502) of motors 119 are located in a first physical container (e.g., first physical container 110) in a first neighborhood (e.g., first neighborhood 512) in a first building (e.g., building 101) and that a second subset (e.g., second cohort set 504) of the motors 119 are located in a second physical container (e.g., second physical container 112) in the first neighborhood (e.g., first neighborhood 512).

In some implementations, motor network mapping device 102 determines that first subset (e.g., first cohort set 502) of the motors 119 are located in a first physical container (e.g., first physical container 110) in a first neighborhood (e.g., first neighborhood 512) in a first building (e.g., building 101) and that a second subset (e.g., fourth cohort set 508) of the motors 119 are located in a second physical container (e.g., fourth physical container 116) in a second neighborhood (e.g., second neighborhood 514) in the first building (e.g., building 101). Motor network mapping device 102, in some embodiments, is included in a first motor (e.g., motor 122) of the plurality of motors 119. The first motor (e.g., motor 122) is located in a first physical container (e.g., first physical container 110), and motor network mapping device 102 receives a message signal (e.g., message signal 158) from a second motor (e.g., motor 120) that is located in the first physical container 110 and that is coupled to a door sensor (e.g., door sensor 146) of the first physical container 110, wherein the message signal 158 indicates a change in a status of a door. Motor network mapping device 102 determines from a source identifier (e.g., source identifier 402) in the message signal 158 and from map 302 that the second motor (e.g., motor 120) is located in the first physical container 110 and adjust an operation of the first motor (e.g., motor 122) upon determining that the second motor (e.g., motor 120) that transmitted the message signal (e.g., message signal 158) is located in the first physical container 110.

In some implementations, motor network mapping device 102 is included in a first motor (e.g., motor 122) of the plurality of motors 119. The first motor (e.g., motor 122) is located in a first physical container (e.g., first physical container 110). The motor network mapping device 102 receives a message signal (e.g., message signal 158) from a second motor (e.g., motor 120) that is located in the first physical container 110 and that is coupled to an occupancy sensor (e.g., occupancy sensor 148) associated with first physical container 110. The message signal (e.g., message signal 158) indicates a change in occupancy within a predefined range (e.g., three meters) of the first physical container (e.g., first physical container 110). Additionally, motor network mapping device 102 determines from a source identifier (e.g., source identifier 402) in the message signal (e.g., message signal 158) and from map 302 that the second motor (e.g., motor 120) is located in the first physical container (e.g., first physical container 110), and adjusts an operation of the first motor (e.g., transmitting an illumination signal from motor 122 to lighting device 152) upon determining that the second motor (e.g., motor 120) that transmitted the message signal (e.g., message signal 158) is located in the first physical container (e.g., first physical container 110).

In some embodiments, motor network mapping device 102 is included in a first motor (e.g. first motor 120) of the plurality of motors 119. The first motor (e.g., first motor 120) is located in a first physical container (e.g., first physical container 110). Motor network mapping device 102 receives a message signal (e.g., message signal 158) from a second motor (e.g., second motor 122) that is located in the first physical container (e.g., first physical container 110). The message signal (e.g., message signal 158) indicates that the second motor (e.g., second motor 122) is operating below at least one predefined target operational parameter (e.g., target operating parameters 306). Additionally, motor network mapping device 102 determines from a source identifier (e.g., source identifier 402) in message signal 158 and from map 302 that the second motor (e.g., second motor 122) is located in the first physical container (e.g., first physical container 110) and increases at least one operational parameter (e.g., target operating parameter 306) of the first motor (e.g., first motor 120) upon determining that the second motor (e.g., second motor 122) that transmitted the message signal 158 is located in the first physical container (e.g., first physical container 110).

In some implementations, motor network mapping device 102 is included in a first motor (e.g., first motor 120) of the plurality of motors 119. Motor network mapping device 102 determines that the first motor (e.g., first motor 120) is located in a physical container (e.g., first physical container 110) with at least a second motor (e.g., second motor 122) of the plurality of motors 119. Additionally, motor network mapping device 102 determines operating parameters of at least the second motor (e.g., from a message signal 158 transmitted from second motor 122 wherein message 404 indicates current operating parameters 308 and/or target operating parameters 306), and adjusts an operation of the first motor (e.g., first motor 120) to correspond with the operating parameters (e.g., from a message signal 158 transmitted from second motor 122, wherein message 404 indicates current operating parameters 308 and/or target operating parameters 306) of the second motor (e.g., second motor 122). For example, when first motor 120 is installed, first motor automatically configures target operating parameters 306 and current operating parameters 308 to equally distribute an air moving load among motors 119 in first physical container 110.

The methods and systems described herein may be implemented using computer programming or engineering techniques including computer software, firmware, hardware or any combination or subset thereof, wherein the technical effect may include at least one of: (a) determining physical distances between a plurality of motors in a network using properties of electronic test signals transmitted through a power line coupled to the plurality of motors; (b) generating a map of physical locations of the motors using the determined physical distances between the plurality of motors; and (c) storing the map in a memory device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods in which motors are installed in a network, the systems and methods described herein enable automatic generation of a map of the physical locations of the motors in the network and automatic coordination between the motors that takes into account their locations relative to one another. Accordingly, changes to the locations and/or performance of the motors over time are automatically compensated for, without requiring the time and expense for a technician to reprogram the operational parameters of the motors.

Exemplary embodiments of systems and methods for generating a map of the physical locations of motors in a network are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor network mapping device comprising a processor coupled to a memory device, said motor network mapping device is configured to: receive, by the processor, electronic test signals from a plurality of motors connected in a network at an installation site, the electronic test signals transmitted through a power wire coupled to and configured to provide power to each motor of the plurality of motors, the plurality of motors located in a plurality of physical cabinets at the installation site; determine, by the processor, a physical proximity of each motor relative to each of the remaining plurality of motors based on electrical properties of the received electronic test signals transmitted through the power wire, the electrical properties including at least one of time domain responses, frequency domain responses, and amounts of attenuation in the electronic test signals transmitted through the network; determine, by the processor, that first and second motors of the plurality of motors are located in a first physical cabinet of the plurality of physical cabinets based on the electrical properties;

generate, by the processor, a map of physical proximities of the plurality of motors using the determined physical locations proximities of the plurality of motors; store the map in said memory device;

receive, by the processor, a message from the second motor indicating a change in operating status of the second motor, the message transmitted through the power wire; and adjust, by the processor, an operating parameter of the first motor based on the received message.

2. The motor network mapping device of claim 1, further configured to transmit the map to the plurality of motors.

3. The motor network mapping device of claim 1, further configured to:

receive a message signal from a source motor included in the plurality of motors in the network, wherein the message includes a source identifier and a message; and determine the physical location that the message pertains to using the source identifier and the map.

4. The motor network mapping device of claim 1, further configured to determine that a first subset of the motors are located in the first physical container in a first neighborhood in a first building and that a second subset of the motors are located in the second physical container in the first neighborhood.

5. The motor network mapping device of claim 1, further configured to determine that the first subset of the motors are located in the first physical container in a first neighborhood in a first building and that a second subset of the motors are located in the second physical container in a second neighborhood in the first building.

6. The motor network mapping device of claim 1, wherein said motor network mapping device is included in the first motor said motor network mapping device is further configured to:

receive a message signal from the second motor that is located in the first physical container and that is coupled to a door sensor of the first physical container, wherein the message indicates a change in a status of a door;

determine from a source identifier in the message signal and from the map that the second motor is located in the first physical container; and adjust an operation of the first motor upon determining that the second motor that transmitted the message signal is located in the first physical container.

7. The motor network mapping device of claim 1, wherein said motor network mapping device is included in the first motor, said motor network mapping device is further configured to:

receive a message signal from the second motor that is coupled to an occupancy sensor associated with the first physical container, wherein the message indicates a change in occupancy within a predefined range of the first physical container;

determine from a source identifier in the message signal and from the map that the second motor is located in the first physical container; and adjust an operation of the first motor upon determining that the second motor that transmitted the message signal is located in the first physical container.

8. The motor network mapping device of claim 7, wherein said motor network mapping device is additionally coupled to a lighting device, said motor network mapping device is further configured to transmit an illumination signal to the lighting device upon determining that the second motor that transmitted the message is located in the first physical container.

9. The motor network mapping device of claim 1, wherein said motor network mapping device is included in the first motor, said motor network mapping device is further configured to:

receive a message signal from the second motor that is located in the first physical container, wherein the message signal indicates that the second motor is operating below at least one predefined target operational parameter;

determine from a source identifier in the message signal and from the map that the second motor is located in the first physical container; and increase at least one operational parameter of the first motor upon determining that the second motor that transmitted the message signal is located in the first physical container.

10. The motor network mapping device of claim 1, wherein said motor network mapping device is included in the first motor, said motor network mapping device is further configured to:

determine that the first motor is located in a physical container with at least a second motor of the plurality of motors;

determine operating parameters of at least the second motor; and adjust an operation of the first motor to correspond with the operating parameters of the second motor.

11. A method for mapping locations of motors in a network, said method is implemented by a motor network mapping device including a processor coupled to a memory device, said method comprising:

receiving, by the motor network mapping device, electronic test signals from a plurality of motors connected in a network at an installation site, the electronic test signals transmitted through a power wire coupled to and configured to provide power to each motor of the plurality of motors, the plurality of motors located in a plurality of physical cabinets at the installation site;

determining, by the motor network mapping device, a physical proximity of each motor relative to each of the remaining plurality of motors based on electrical properties of the received electronic test signals transmitted through the power wire, wherein the electrical properties include at least one of time domain responses, frequency domain responses, and amounts of attenuation in the electronic test signals transmitted through the network;

determining, by the motor network mapping device, that first and second motors of the plurality of motors are located in a first physical cabinet of the plurality of physical cabinets based on the electrical properties;

generating, by the motor network mapping device, a map of physical proximities of the plurality of motors using the determined physical proximities of the plurality of motors;

storing, by the motor network mapping device, the map in the memory device;

receive, by the motor network mapping device, a message from the second motor indicating a change in operating status of the second motor, the message transmitted through the power wire; and adjust, by the motor network mapping device, an operating parameter of the first motor based on the received message.

12. The method of claim 11, further comprising transmitting the map to the plurality of motors.

13. The method of claim 11, further comprising:

receiving a message signal from a source motor included in the plurality of motors in the network, wherein the message includes a source identifier and a message; and determining the physical location that the message pertains to using the source identifier and the map.

14. The method of claim 11, further comprising determining that a first subset of the motors are located in the first physical container in a first neighborhood in a first building and that a second subset of the motors are located in a second physical container in a second neighborhood in the first building.

15. The method of claim 11, wherein the motor network mapping device is included in the first motor, said method further comprising:

receiving a message signal from the second motor that is located in the first physical container and that is coupled to a door sensor of the first physical container, wherein the message indicates a change in a status of a door;

determining from a source identifier in the message signal and from the map that the second motor is located in the first physical container; and adjusting an operation of the first motor upon determining that the second motor that transmitted the message signal is located in the first physical container.

16. The method of claim 11, wherein the motor network mapping device is included in the first motor, said method further comprising: receiving a message signal from the second motor that is located in the first physical container and that is coupled to an occupancy sensor associated with the first physical container, wherein the message indicates a change in occupancy within a predefined range of the first physical container;

determining from a source identifier in the message signal and from the map that the second motor is located in the first physical container; and adjusting an operation of the first motor upon determining that the second motor that transmitted the message signal is located in the first physical container.

17. The method of claim 11, wherein the motor network mapping device is included in the first motor, said method further comprising: receiving a message signal from the second motor that is located in the first physical container, wherein the message signal indicates that the second motor is operating below at least one predefined target operational parameter;

determining from a source identifier in the message signal and from the map that the second motor is located in the first physical container; and increasing at least one operational parameter of the first motor upon determining that the second motor that transmitted the message signal is located in the first physical container.

18. A computer-readable storage memory device having computer-executable instructions stored thereon, wherein when executed by a motor network mapping device including a processor coupled to a memory device, said instructions cause the motor network mapping device to:

receive electronic test signals from a plurality of motors connected in a network at an installation site, the electronic test signals transmitted through a power wire coupled to and configured to provide power to each motor of the plurality of motors, the plurality of motors located in a plurality of physical cabinets at the installation site;

determine a physical proximity of each motor relative to each of the remaining plurality of motors based on electrical properties of the received electronic test signals transmitted through the power wire, the electrical properties including at least one of time domain responses, frequency domain responses, and amounts of attenuation in the electronic test signals transmitted through the network;

determine, by the processor, that first and second motors of the plurality of motors are located in a first physical cabinet of the plurality of physical cabinets based on the electrical properties;

generate a map of physical proximities of the plurality of motors using the determined physical proximities of the plurality of motors;

store the map in the memory device;

receive a message from the second motor indicating a change in operating status of the second motor, the message transmitted through the power wire; and adjust an operating parameter of the first motor based on the received message.

* * * * *